United States Patent
Nariyuki et al.

(10) Patent No.: US 7,928,401 B2
(45) Date of Patent: Apr. 19, 2011

(54) RADIATION DETECTING SYSTEM

(75) Inventors: Fumito Nariyuki, Kanagawa-ken (JP); Shinji Imai, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 917 days.

(21) Appl. No.: 11/762,895

(22) Filed: Jun. 14, 2007

(65) Prior Publication Data
US 2010/0163739 A1    Jul. 1, 2010

(30) Foreign Application Priority Data
Jun. 14, 2006   (JP) ................. 2006-164351

(51) Int. Cl.
*G01T 1/24*   (2006.01)
*H01L 27/146*  (2006.01)

(52) U.S. Cl. ............... 250/370.12; 250/370.09

(58) Field of Classification Search ............. 250/370.12, 250/370.09
See application file for complete search history.

(56) References Cited

U.S. PATENT DOCUMENTS
5,880,472 A    3/1999   Polischuk et al.
6,495,817 B1  12/2002   Sato et al.
2003/0098427 A1 *  5/2003   Ogawa ..................... 250/591
2004/0104362 A1 *  6/2004   Imai ........................ 250/582
2006/0180768 A1 *  8/2006   Bogdanovich et al. .. 250/370.09

OTHER PUBLICATIONS

Advance Coating 2002 (conformal-coating.com).*
D.W. Seok et al., "New CsI: Na-Selenium X-ray Detector", Proceedings of SPIE, 2004, pp. 633-638, vol. 5368.

* cited by examiner

*Primary Examiner* — David P Porta
*Assistant Examiner* — Mindy Vu
(74) *Attorney, Agent, or Firm* — Sughrue Mion, PLLC

(57) ABSTRACT

In a radiation detecting system including an electric voltage imparting electrode through which a bias electric voltage is applied, a recording photoconductive layer which comprises a-Se and generates electric charges in response to receipt of projection of radiation, a carrier collecting electrode, a charge storing portion which stores electric charges generated in the recording photoconductive layer and a switching element for reading out charge signal stored in the charge storing portion, superposed one on another in this order, an organic resin dielectric layer which is not smaller than 0.01 μm and smaller than 1 μm in thickness, not lower than $10^{12}$ Ωcm in specific resistance and $6\times10^{-6}$ to $1.5\times10^{-4}$/° C. in thermal expansion coefficient is provided between the recording photoconductive layer and the electric voltage imparting electrode.

2 Claims, 3 Drawing Sheets

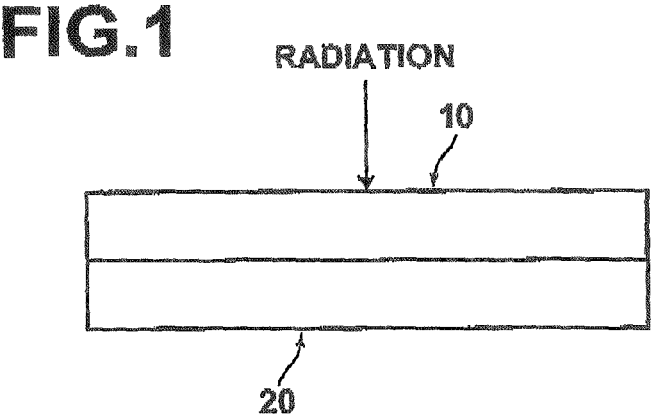
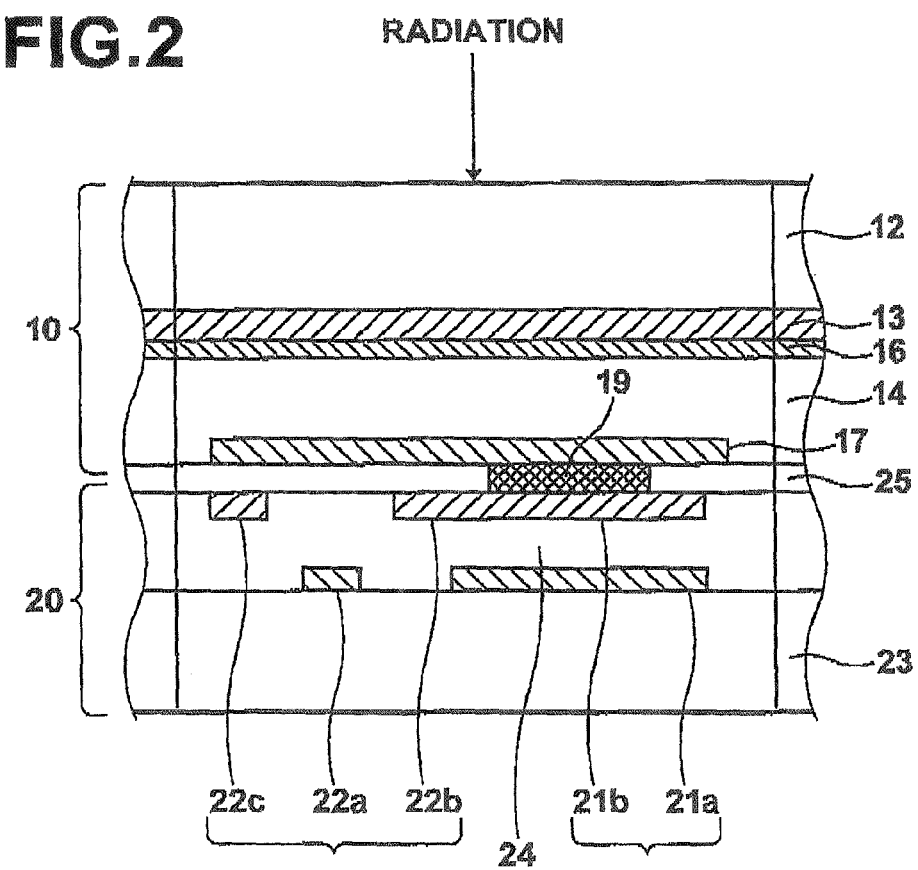

RADIATION DETECTING SYSTEM

BACKGROUND OF THE INVENTION

1. Field of the Invention

This invention relates to a radiation detecting system suitable for applying to a radiation image taking system such as an X-ray system, and more particularly to a direct-conversion type radiation detecting system.

2. Description of the Related Art

In the medical radiation image taking, there has been known a radiation detecting system using a radiation sensor (having semiconductor as a main component) which detects radiation and converts it to an electric signal. As the radiation sensor, there has been known those of a direct conversion system where radiation is directly converted to electric charges and the electric charges are stored and an indirect conversion system where radiation is once converted to light by a scintillator or the like, the light is converted to electric charges by a photoconductive layer and the electric charges are stored. From the reading system, the radiation sensor is broadly divided into the following two systems. That is, one is optical reading system, where the image is read out by a radiation sensor which generates electric charges by the use of a semiconductor in response to projection of light and the other is a so-called TFT system, where the image is read out by storing electric charges generated in response to projection of radiation and reading the stored electric charges by turning on and off electric switches each for one pixel such as thin film transistors (TFT).

As a radiation sensor of an indirect conversion system using CsI:Na as the scintillator and using a-Se as the photoconductive layer, there is disclosed in "New CsI:Na-Selenium X-ray Detector", D. A. Seok et al., Proceedings of SPIE, Vol. 5368, pp. 633-638, 2004 a radiation sensor where Parylene film 1 to 9 µm thick as a dielectric layer is provided on a-Se as the photoconductive layer. Further, in U.S. Pat. No. 5,880,472, there is disclosed a radiation sensor having a dielectric layer film of PC, polyester, Parylene or the like 30 to 150 µm thick.

On the other hand, the direct conversion type radiation sensor detects the radiation by imparting a predetermined bias voltage to a voltage imparting electrode formed on the surface of a radiation-sensitive semiconductor film (recording photoconductive layer) and taking out a radiation detecting signal by collecting carriers generated in response to projection of radiation with a carrier collecting electrode formed on the back side of semiconductor film and the recording photoconductive layer is often formed by amorphous selenium (a-se) since it exhibits high dark resistance and is excellent in response speed.

Further, the direct conversion type radiation sensor is often provided with a carrier selective semi-insulating layer in order to give rectifying characteristics to the interface of the voltage imparting electrode and the photoconductive layer and to reduce the dark current. For example, there is disclosed $Sb_2S_3$ as the carrier selective semi-insulating layer in U.S. Pat. No. 6,495,817.

However, in the radiation sensor disclosed in "New CsI: Na-Selenium X-ray Detector", D. A. Seok et al., Proceedings of SPIE, Vol. 5368, pp. 633-638, 2004 or U.S. Pat. No. 5,880, 472 the dielectric layer is relatively thick and whether the dark current characteristics and the sensitivity are compatible each other is unknown.

Further, there is a problem that, when the carrier selective semi-insulating layer is formed over the recording photoconductive layer of a-Se by deposition, the a-Se layer is crystallized under the heat of the deposition, which leads to generation of image defect, generation of noise, and deterioration of S/N ratio. Further, when $Sb_2S_3$ layer is formed as the carrier selective semi-insulating layer, the large difference in the thermal expansion coefficient between the carrier selective semi-insulating layer and a-Se layer can make cracks in the $Sb_2S_3$ layer due to change in the environmental temperature and warpage of the substrate.

SUMMARY OF THE INVENTION

In view of the foregoing observations and description, the primary object of the present invention is to provide a radiation detecting system which can give rectifying characteristics to the interface of the voltage imparting electrode and the photoconductive layer and reduce the dark current without deteriorating the sensitivity and at the same time, can suppress crystallization when a-Se is used as the photoconductive layer thereby overcoming a problem of peeling off of the carrier selective semi-insulating layer and the cracks in the carrier selective semi-insulating layer.

In accordance with the present invention, there is provided a radiation detecting system comprising an electric voltage imparting electrode through which a bias electric voltage is applied, a recording photoconductive layer which comprises a-Se and generates electric charges in response to receipt of projection of radiation, a carrier collecting electrode, a charge storing portion which stores electric charges generated in the recording photoconductive layer and a switching element for reading out charge signal stored in the charge storing portion, superposed one on another in this order, wherein the improvement comprises that an organic resin dielectric layer which is not smaller than 0.01 µm and smaller than 1 µm in thickness, not lower than $10^{12}$ Ωcm in specific resistance and $6 \times 10^{-6}$ to $1.5 \times 10^{-4}$/° C. in thermal expansion coefficient is provided between the recording photoconductive layer and the electric voltage imparting electrode.

As the organic resin dielectric layer, Parylene is more preferred.

The radiation detecting system of the present invention may be provided with a carrier-selective semi-insulating layer between the organic resin dielectric layer and the electric voltage imparting electrode.

The radiation detecting system of the present invention, since an organic resin dielectric layer which is not smaller than 0.01 µm and smaller than 1 µm in thickness, not lower than $10^{12}$ Ωcm in specific resistance and $6 \times 10^{-6}$ to $1.5 \times 10^{-4}$/° C. in thermal expansion coefficient is provided between the recording photoconductive layer and the electric voltage imparting electrode in a radiation detecting system having a recording photoconductive layer which comprises a-Se and generates electric charges in response to receipt of projection of radiation, can give rectifying characteristics to the interface of the voltage imparting electrode and the photoconductive layer and reduce the dark current without deteriorating the sensitivity and at the same time, suppress peeling off on the interfaces of the voltage imparting electrode and the photoconductive layer and of the organic resin dielectric layer and the electric voltage imparting electrode.

Further, though there is a problem that a-Se is crystallized under the heat of the deposition when the radiation detecting system is provided with a carrier selective semi-insulating layer between the organic resin dielectric layer and the electric voltage imparting electrode and the carrier selective semi-insulating layer is formed on the recording photoconductive layer comprising a-Se by, for instance, deposition, crystallization of a-Se is suppressed and further peeling off on the interfaces of the voltage imparting electrode and the photoconductive layer and of the organic resin dielectric layer and the electric voltage imparting electrode is suppressed when the carrier selective semi-insulating layer is formed on the organic resin dielectric layer.

BRIEF DESCRIPTION OF THE DRAWINGS

FIG. 1 is a schematic view showing a state of integration of the radiation detecting portion and the switching element in the radiation detecting system in accordance with an embodiment of the present invention, FIG. 2 is a schematic view showing a pixel of the radiation detecting portion in the radiation detecting system.

DESCRIPTION OF THE PREFERRED EMBODIMENT

Figure 3:
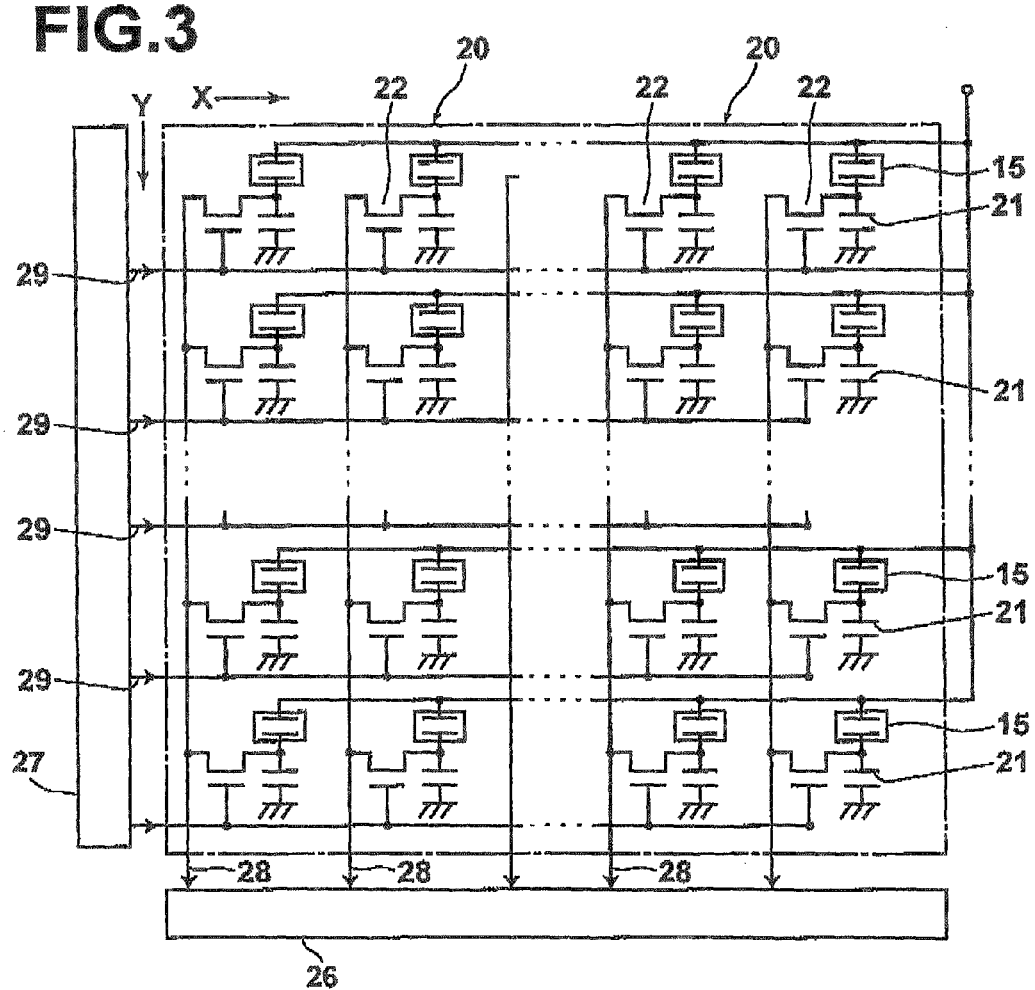
FIG. 3 is a schematic view showing the arrangement of the radiation detecting portion and an equivalent circuit of the switching element.
Figure 4:
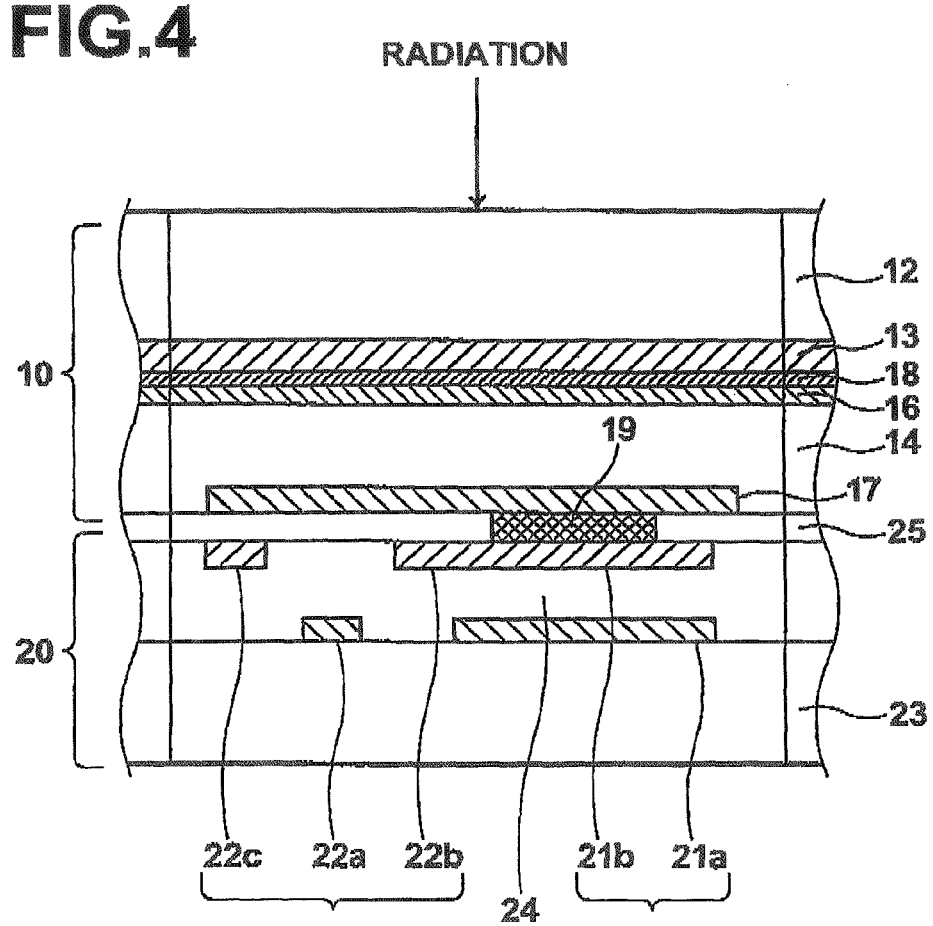
FIG. 4 is a schematic view showing a pixel of the radiation detecting portion in another radiation detecting system.

Radiation detecting systems in accordance with embodiments of the present invention will be described in detail, hereinbelow. FIG. 1 is a schematic view showing a state of integration of the radiation detecting portion and the switching element in the radiation detecting system in accordance with an embodiment of the present invention, FIG. 2 is a schematic view showing a pixel of the radiation detecting portion in the radiation detecting system, FIG. 3 is a schematic view showing the arrangement of the radiation detecting portion and an equivalent circuit of the switching element, and FIG. 4 is a schematic view showing a pixel of the radiation detecting portion in another radiation detecting system.

As shown in FIG. 1, a radiation detecting system of the present invention comprises structure in which a radiation detecting portion 10 and an active matrix array substrate (will be referred to as "AMA substrate", hereinbelow.) 20 are bonded together. As shown in FIG. 2, the radiation detecting portion 10 broadly comprises an electric voltage imparting electrode 13 through which a bias electric voltage is applied, a recording photoconductive layer 14 which generates in response to object radiation to be detected carriers which are electron-positive hole pairs and a carrier collecting electrode 17 superposed one on another in this order from the radiation inlet side and an organic resin dielectric layer 16 is provided between the recording photoconductive layer 14 and the electric voltage imparting electrode 13. Further, a radiation detecting portion support 12 is provided on the electric voltage imparting electrode 13.

It is preferred that no electrode is formed between edges of the electric voltage imparting electrode 13 and the recording photoconductive layer 14 over the entire length thereof. With this arrangement, since the electric voltage imparting electrode 13 is surrounded by the organic resin dielectric layer 16, which is high in surface resistance, and the creeping voltage-proof between the electric voltage imparting electrode 13 and the grounding side is sufficient, the creeping discharge by the bias voltage for the recording photoconductive layer 14 is less apt to occur.

The recording photoconductive layer 14 is a photoconductive layer comprising a-Se. The electric voltage imparting electrode 13 or the carrier collecting electrode 17 comprises conductive material such as ITO (indium-tin oxide), Au, Al or Pt. It is preferred that a positive bias voltage be applied to the electric voltage imparting electrode 13 when the electric voltage imparting electrode 13 is of Au and a negative bias voltage be applied to the electric voltage imparting electrode 13 when the electric voltage imparting electrode 13 is of Al. A positive hole injection blocking layer or an electron injection blocking layer may be provided to the electric voltage imparting electrode 13 and/or the carrier collecting electrode 17 according to the polarity of the bias voltage.

The organic resin dielectric layer 16 is an organic resin dielectric body which is not smaller than 0.01 μm and smaller than 1 μm in thickness, not lower than $10^{12}$ Ωcm in specific resistance and $6 \times 10^{-6}$ to $1.5 \times 10^{-4}$/° C. in thermal expansion coefficient. When the organic resin dielectric layer 16 is smaller than 0.01 μm in thickness, reduction of the dark current is not sufficient and when the organic resin dielectric layer 16 is not smaller than 1 μm in thickness, the sensitivity deteriorates. When the specific resistance is lower than $10^{12}$ Ωcm, reduction of the dark current is not sufficient. When the thermal expansion coefficient is smaller than $6 \times 10^{-6}$, the difference in thermal expansion coefficient between a-Se which is used for forming the recording photoconductive layer 14 is large and peeling off or crack is sometimes generated in the organic resin dielectric layer, and peeling off is sometimes generated also when the thermal expansion coefficient is larger than $1.5 \times 10^{-4}$.

As specific examples of the organic resin dielectric layer, acrylic resin such as Parylene, polycarbonate, or polymethyl methacrylate may be shown, and among those, Parylene is preferable.

Polyparaxilylene material for forming Parylene to be used as the organic resin dielectric layer in the present invention may include compounds represented by the following structural formulae.

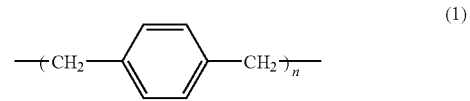

(1)

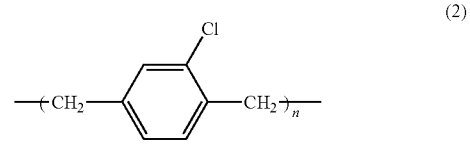

(2)

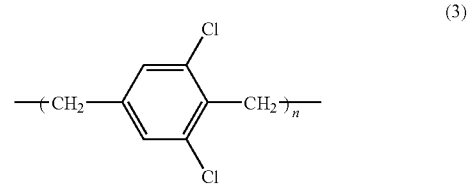

(3)

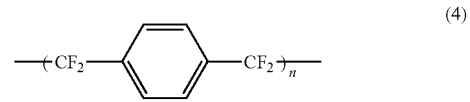

(4)

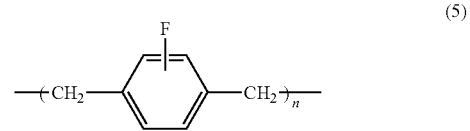

(5)

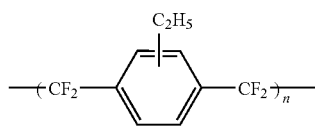

(6)

wherein n represents an integer not smaller than 5,000.

These compounds may be used alone or in combination with each other.

The Parylene film is formed by vapor phase deposition polymerization. The deposition system is of three steps. That is, a first step where a vaporization of diparaxilylene (A), which is a raw material and solid dimer, takes place. A second step where diradical paraxilylene (B) is generated by thermal degradation of the dimer. A third step where adsorption of diradical paraxilylene by the substrate material and polymerization are simultaneously generated and the film of polyparaxilylene (C) is formed. The reaction formula of the compound represented by formula (I) in these three steps is as follows.

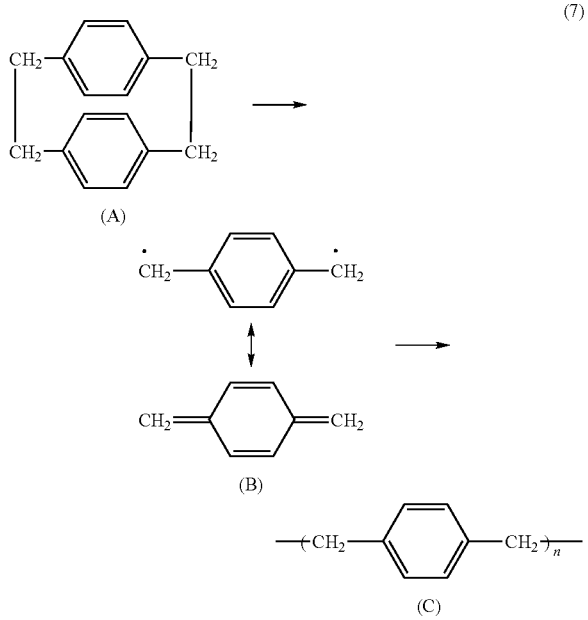

(7)

During these steps, the degree of vacuum is generally 0.13 to 133.3 Pa ($10^{-3}$ to 1 Torr), and the first to third steps are carried out under 100 to 200° C., 450 to 700° C., and room temperatures, respectively. Accordingly, since, formation of Parylene film itself may be done under room temperatures, formation of Parylene film can be done without giving a thermal history to the substrate material. Accordingly, even if Parylene is formed on a recording photoconductive layer comprising a-Se, crystallization of a-Se can be avoided.

Additionally, by Parylene film, there can be obtained an organic resin dielectric layer which has an electric insulating performance exceeding silicone, epoxy, urethane and the like, insolubility where it is insoluble in all organic solvent under a temperature not higher than 150° C., resistance to chemical attack where it is not eroded to almost all acids or alkalis, resistance to heat distortion where it withstand use for 10 years at a temperature not lower than 200° C. so long as in an atmosphere of vacuum or inert gas, resistance to low temperature brittleness where it is not damaged by bending through 180° even at a low temperature of −150° C., permeability and precision to the narrow gap of order of microns, and gas barrier properties where very little amount of steam and gas is permeable and outgas from a body adhering thereto is excellently barriered.

The radiation detecting system of the present invention may be provided with a carrier-selective semi-insulating layer 18 between the organic resin dielectric layer 16 and the electric voltage imparting electrode 13 as shown in FIG. 4. When radiation is detected, by the carrier selectivity of the carrier-selective semi-insulating layer 18, injection of carriers (electron or positive holes) which do not contribute to radiation detection and becomes a component of the dark current is suppressed to keep the dark current low and at the same time since carriers which contributes to radiation detection are not blocked, whereby, responsibility to a signal can be maintained without deterioration.

It is preferred that a p-type carrier-selective semi-insulating layer be not smaller than $10^8$ Ωcm in specific resistance and film of $Sb_2S_3$, SbTe, ZnTe, CdTe, AsSe or the like and organic film which are 0.01 μm to 10 μm (normally 0.5 μm or so) thick are suitable. There is a tendency that when the thickness is not larger than 0.01 μm, it is hard to prevent injection of unnecessary carriers and when the thickness is larger than 10 μm, it is hard to accept injection of necessary carriers. It is preferred that an n-type carrier-selective semi-insulating layer be not smaller than $10^8$ Ωcm in specific resistance and film of CdS, $CeO_2$ or the like which is 0.01 μm to 10 μm (normally 0.5 μm or so) thick is suitable.

AMA substrate (electric charge detecting element) 20 will be described, hereinbelow. As shown in FIG. 3, in the AMA substrate 20, a capacitor 21 (portion) which forms an electric charge collecting capacity and a TFT (as a switching element) 22 is provided for each pixel of the radiation detecting portion 15. In the support 12, the radiation detecting portions 15 corresponding to the pixels in number are two-dimensionally arranged in matrices of 1000 to 3000×1000 to 3000 according to the necessary number of pixels. Further, in the AMA substrate 20, capacitors 21 and the TFTs 22 which are the same in number are two-dimensionally arranged in similar matrices. Electric charges generated in the photoconductive layer are stored in the capacitors 21 and an electrostatic image generated by radiation is held as a charge collecting capacity.

A specific arrangement of the capacitors 21 and the TFTs 22 are as shown in FIG. 2. That is, the AMA substrate supporting member 23 is an insulating member and on a grounding electrode 21b of the capacitor 21 and a gate electrode 22a of the TFT 22 which are formed on the surface thereof, a connecting electrode 21b of the capacitor 21 and a source electrode 22b of the TFT 22 are laminated by way of an insulating film 24. Further, the outermost side is covered with a protective insulating film 25. The connecting electrode 21b of the capacitor 21 and the source electrode 22b of the TFT 22 are integrated into a single electrode formed at one time. As the insulating film 24 which forms both capacity insulating film of the capacitor 21 and gate insulating film of the TFT 22, for instance, plasma SiN film may be used. This AMA substrate 20 is formed by a film forming technic and/or a fine processing technic as used in production of a displaying substrate of a liquid crystal.

Then bonding of the radiation detecting portion 10 and the AMA substrate 20 will be described, hereinbelow. By heating and pressing the radiation detecting portion 10 and the AMA substrate 20 intervening therebetween anisotropic film (ACF) including conductive particles such as silver particles and exhibiting conductivity only in a direction of thickness, with the carrier collecting electrode 17 and the connecting electrode 21b of the capacitor 21 located to each other, the radiation detecting portion 10 and the AMA substrate 20 are mechanically bonded together and the carrier collecting electrode 17 and the connecting electrode 21b of the capacitor 21 are electrically connected by way of an intervening conductive body 19. When one side of the photoconductive layer 15 is not smaller than 5 μm and not larger than 10 μm in average surface roughness, the surface is employed as a surface facing the he carrier collecting electrode 17. With this arrangement, the close contact between the photoconductive layer 15 and the electrodes becomes excellent.

Further, the AMA substrate 20 is provided with a read-out drive circuit 26 and a gate drive circuit 27. The read-out drive circuit 26 is connected to, as shown in FIG. 3, to read-out lines (read-out address cables) 28 in the vertical (Y) direction joining drain electrodes of the TFTs 22 which are in the same columns whereas the gate drive circuit 27 is connected to read-out lines (gate address cables) 29 in the lateral (X) direction joining gate electrodes of the TFTs 22 which are in the same row. Further, though not shown, in the read-out drive circuit 26, a pre-amplifier (charge-voltage converter) is connected to each read-out lines 28. Thus the read-out drive circuit 26 and the gate drive circuit 27 are connected to the AMA substrate 20. Further, those in which the read-out drive circuit 26 and the gate drive circuit 27 are integrally molded in the AMA substrate 20 for the purpose of integration may be employed.

Further, radiation detecting action in the radiation image taking system where the above radiation detecting portion 10 and the above AMA substrate 20 are integrated is disclosed in, for instance, Japanese Unexamined Patent Publication No. 11 (1999)-287862.

The radiation detecting system of the present invention will be described in further detail on the basis of the examples.

EXAMPLES

Radiation detecting systems were produced by bonding a radiation detecting portion, comprising an electric voltage imparting electrode of Au to which a bias voltage was applied, an organic resin dielectric layer of material and thickness shown in table 1, a recording photoconductive layer of a-Se 1000 μm thick and a carrier collecting electrode of ITO ($In_2O_3$:Sn) superposed one on another in this order, to the above described switching element. Further, in embodiment 3 and comparative example 1, there were respectively produced radiation detecting systems which further comprised a carrier selective semi-insulating layer of $Sb_2S_3$ between the organic resin dielectric layer and the electric voltage imparting electrode, and a carrier selective semi-insulating layer of $Sb_2S_3$ with no organic resin dielectric layer.

Dark current, deterioration in sensitivity, the thermal expansion coefficient of the organic resin dielectric layer and film stability of the produced radiation detecting systems were evaluated. The dark current shows a value measured 3 minutes after imparting a voltage of +10 kV to the electric voltage imparting electrode when the current is stabilized. The deterioration in sensitivity was evaluated by proportion by which the current upon 10 time projection is lowered to that upon first time projection when X-ray pulse of 300 mR (80 keV, 710 milliseconds) was projected 10 times at intervals of 15 seconds in a state where a voltage of +10 kV is imparted to the electric voltage imparting electrode. When the proportion was smaller than 3%, the deterioration in sensitivity was evaluated as ⊚, when the proportion was not larger than 3% and smaller than 6%, the deterioration in sensitivity was evaluated as ○, when the proportion was not larger than 6% and smaller than 12%, the deterioration in sensitivity was evaluated as Δ and when the proportion was not smaller than 12%, the deterioration in sensitivity was evaluated as x.

The thermal expansion coefficient of the organic resin dielectric layer was calculated by forming the resin layer on an Si substrate, measuring warpage by a film stress meter, and by calculation from an average radius of curvature of warpage obtained from the distribution of warpage of the sample, and Young's modulus and Poisson's ratio of the film.

The film stability was evaluated by peeling of the film and the crack in the film after film was placed in a dry environment at 35° C. for 300 hours. That is, through visual observation and observation through an optical microscope, those free from peeling of the film and the crack in the film were represented by ○ and those peeling of the film and the crack in the film were partly generated were represented by x. Result is shown in the following table 1.

TABLE 1

| | dielectric layer | Thickness (μm) | specific resistance (Ωcm) | thermal expansion coefficient (/° C.) | Dark current (A/cm²) | sensitivity deterioration | film stability |
|---|---|---|---|---|---|---|---|
| embodiment 1 | Parylene | 0.9 | $10^{15}$ | $3.5 \times 10^{-5}$ | $<1 \times 10^{-10}$ | ○ | ○ |
| embodiment 2 | Parylene | 0.4 | 10 | $3.5 \times 10^{-5}$ | $2.1 \times 10^{-10}$ | ⊚ | ○ |
| embodiment 3 | Parylene | 0.1 | $10^{15}$ | $3.5 \times 10^{-5}$ | $4.3 \times 10^{-10}$ | ⊚ | ○ |
| embodiment 4 | $Sb_2S_3$/Parylene | 0.1/0.9 | $10^{15}$ | $3.1 \times 10^{-5}$ | $1 \times 10^{-10}$ | ○ | ○ |
| comparative example 1 | $Sb_2S_3$ | 0.9 | $10^8$ | $1.3 \times 10^{-5}$ | $2 \times 10^{-10}$ | ⊚ | X |
| comparative example 2 | PVK | 0.1 | $10^{11}$ | $3 \times 10^{-5}$ | $3 \times 10^{-9}$ | ○ | ○ |
| comparative example 3 | Parylene | 2 | $1.4 \times 10^{15}$ | $3.5 \times 10^{-5}$ | $<1 \times 10^{-10}$ | Δ | ○ |
| comparative example 4 | Parylene | 5 | $1.4 \times 10^{15}$ | $3.5 \times 10^{-5}$ | $<1 \times 10^{-10}$ | X | ○ |

As could be understood from Table 1, in the radiation detecting system of the present invention (embodiment•1 to embodiment 4), the dark current was reduced and the film stability was excellent. Whereas in the comparative example 1, the recording photoconductive layer comprising a-Se crystallized and the film stability was bad due to lack of the organic resin dielectric layer. On the other hand, in the comparative example 2 where PVK (polyvinyl carbazole) was employed as the organic resin dielectric layer, the dark current was large due to a low specific resistance of the PVK. In the embodiments 3 and 4, deterioration in sensitivity was large since the thicknesses thereof were 2 μm and 5 μm and large though Parylene was used as the organic resin dielectric layer.

As can be understood from the description above, in the radiation detecting system which is provided with a recording photoconductive layer comprising a-Se and generates electric charges upon receipt of radiation, the radiation detecting system of the present invention can give rectifying characteristics to the interface of the voltage imparting electrode and the photoconductive layer and reduce the dark current, whereby the film stability can be ensured by virtue of the organic resin dielectric layer, provided between the recording photoconductive layer and the electric voltage imparting electrode, which is not smaller than 0.01 μm and smaller than 1 μm in thickness, not lower than $10^{12}$ Ωcm in specific resistance and $6\times10^{-6}$ to $1.5\times10^{-4}$/° C. in thermal expansion coefficient.

What is claimed is:

1. A radiation detecting system comprising an electric voltage imparting electrode through which a bias electric voltage is applied, a recording photoconductive layer which comprises a-Se and generates electric charges in response to receipt of projection of radiation, a carrier collecting electrode, a charge storing portion which stores electric charges generated in the recording photoconductive layer and a switching element for reading out charge signal stored in the charge storing portion, superposed one on another in this order, wherein the radiation detecting system comprises:
an organic resin dielectric layer which is not smaller than 0.01 μm and smaller than 1 μm in thickness, not lower than $10^{12}$Ωcm in specific resistance and $6\times10^{-6}$ to $1.5\times10^{-4}$/° C. in thermal expansion coefficient, between the recording photoconductive layer and the electric voltage imparting electrode, and
a carrier-selective semi-insulating layer between the organic resin dielectric layer and the electric voltage imparting electrode.

2. A radiation detecting system as defined in claim 1 in which the organic resin dielectric layer is of Parylene.

* * * * *